Patented Apr. 8, 1952

2,592,089

UNITED STATES PATENT OFFICE 2,592,089

MANUFACTURE OF MERCAPTANS

Paul F. Warner, Borger, Tex., assignor to Phillips Petroleum Company, a corporation of Delaware No Drawing. Application August 8, 1949, Serial No. 109,240

9 Claims. (Cl. 260—609)

This invention relates to the manufacture of mercaptans. In one embodiment it relates to the synthesis of high boiling aliphatic mercaptans by the reaction between hydrogen sulfide and aliphatic olefins. In a more specific embodiment this invention relates to the manufacture of aliphatic mercaptans having from 8 to 16 or more carbon atoms per molecule by the catalytic addition of hydrogen sulfide to a specially prepared olefinic feed stock.

The synthesis of aliphatic mercaptans through the direct addition of hydrogen sulfide to an olefinic linkage, with or without the presence of a catalyst, is a well established reaction. However, the application of this reaction to the production of high molecular weight aliphatic mercaptans presents special problems relative to olefinic feed stocks, reaction conditions, and the like. Straight thermal methods have been applied to the olefin-sulfide reaction to produce mixtures of mercaptans and thioethers. Catalytic methods have been proposed wherein metallic sulfides, fuller's earth, silica gel, charcoal and the like have been used as catalysts. The reaction of an olefin with hydrogen sulfide to form a mercaptan is frequently hindered by certain foreign materials in the olefin feed stock which have a deleterious effect either on the catalyst or on the product formed. At times, for example, olefinic feed stocks derived from cracked hydrocarbon streams, or olefin polymers which have been made by catalytic or non-catalytic polymerization or copolymerization of olefins which have been stored for a period of time, contain certain deleterious compounds, such as aldehydes, ketones, acids or other oxygenated compounds, or other foreign compounds, color bodies, and the like which greatly reduce catalyst life or impart undesirable properties to the product. This is apt to be particularly true of heavier olefinic stocks, such as those used to produce mercaptans containing from 8 to 16 carbon atoms per molecule. In accordance with the present invention, these deleterious substances can be removed from the olefinic feed stock or transformed into less harmful compounds by treating the olefin-containing material with a surface active material, such as silica gel, activated charcoal, or activated clay, at a temperature in the range of from about 0 to about 150° F. prior to introducing the olefin-containing feed to the reactor where the olefin is caused to react with hydrogen sulfide to produce mercaptans.

An object of this invention is to provide an improved process for the reaction of olefins with hydrogen sulfide.

Another object of this invention is to provide an improved process for the manufacture of high molecular weight aliphatic mercaptans.

Still another object of this invention is to remove undesirable constituents from an olefin feed stock by contacting the olefin feed stock with a solid adsorbent material.

Still a further object of this invention is to react hydrogen sulfide with aliphatic olefins containing from 8 to 16 or more carbon atoms per molecule wherein the olefins have been pretreated to remove undesirable constituents.

Still a further object is to produce an improved olefin feed stock for an aliphatic mercaptan manufacturing unit.

Other objects and advantages of this invention will become apparent, to one skilled in the art, from the accompanying disclosure and discussion.

In accordance with this invention, a selected olefinic feed stock containing olefins having from 8 to 16 carbon atoms per molecule is passed over a surface active solid adsorbent mantained at suitable conditions of temperature and pressure whereby deleterious compounds, such as oxygen-containing compounds or the like, are removed or destroyed prior to the time the olefin-containing feed stock is charged to a reaction zone where the olefins contained in such material are converted to mercaptans by reaction with hydrogen sulfide.

The process of this invention is particularly suitable for the production of mercaptans from olefins containing from 12 to 16 carbon atoms per molecule and the pretreating step is especially useful when the raw olefin feed stock comprises olefin polymers or copolymers which have been in storage for a substantial period of time. Though applicant does not wish to be limited to any particular theory in regard to the results obtained by the pretreating step, it is believed that the function of the pretreating step is primarily one of removing small amounts of oxygen-containing compounds or other contaminants which, if allowed to remain in the olefinic feed to the mercaptan synthesis step, would seriously lower the conversion of olefin to mercaptan and the catalyst life in that step of the process. In accordance with the present invention, treatment of olefin polymers or other olefin-containing materials with a surface active agent, such as silica gel, at a temperature in the range of 0 to 150° F. and at substantially atmospheric pressure, results in an improved feed for the mercaptan synthesis step.

Relatively high boiling alkyl mercaptans, such as those having 12 to 16 carbon atoms per molecule, have been found exceedingly useful as modifiers in the manufacture of synthetic rubbers, especially those which have been classified as the Buna-type, that is, copolymers of conjugated diolefins, such as butadiene, with vinyl compounds, such as styrene, acrylonitrile, esters of acrylic acid and the like, particularly when polymerization is carried out in aqueous emulsion. It is now known that certain desirable characteristics of the mercaptans are associated with particular molecular structures which influences such properties as rate of oxidation, relative efficiency as modifiers in polymerization, and the like.

The process of the present invention comprises, in a preferred embodiment, a two step operation in which a selected fraction of olefins in the boiling range of 320 to 400° F. is pretreated in a first step and the olefin-hydrogen sulfide reaction is carried out in a second step. The pretreatment step is preferably effected over a solid adsorbent, such as silica gel, activated charcoal, or an activated clay, such as Silverton clay, at a temperature of from 0 to 150° F.

The effluent from the pretreating step is ordinarily charged directly to the second step, that is, the olefin-hydrogen sulfide reaction zone. In some instances it may be advantageous to fractionate the raw olefin feed stock to prepare a feed stock of relatively restricted boiling range in order to obtain the desired mercaptans. A desirable olefinic feed to the pretreatment step may have a boiling range within the approximate limits of 320 to 400° F. The mercaptan synthesis is advantageously effected in the presence of a catalyst. Any suitable catalyst may be used, but ordinarily solid adsorbent catalysts, such as natural or activated clays, or preferably synthetic gel-type silica-metal oxide compositions, are utilized. Synthetic gel-type catalysts preferably comprise a major portion of silica and a minor portion (usually about 1 to about 5 per cent by weight) of an oxide of a metal belonging to one of the groups IIIB and IVA of the periodic system, including boron, aluminum, gallium, indium, and thallium in group IIIB, and titanium, zirconium, hafnium and thorium in group IVA. The use of such synthetic catalysts to react olefins with hydrogen sulfide to form mercaptans is disclosed in an application, Serial No. 493,463, filed July 3, 1943, which issued on September 2, 1947 as Patent 2,426,646. The pretreated olefin feed stock is charged to the mercaptan reaction zone along with controlled proportions of hydrogen sulfide. It is ordinarily desirable to employ a molal excess of hydrogen sulfide, and inert dilutents may or may not be added. The feed to the mercaptan reaction zone is passed continuously through a stationary bed of granular catalyst or contacted with the solid catalyst in any other desired manner, and the reaction effluent may be continuously fractionated or otherwise treated to separate hydrogen sulfide and unreacted olefins from the product.

In a specific and preferred embodiment of the invention, an olefin feed, such as a $C_{12}$—$C_{16}$ fraction which may be derived from the catalytic co-polymerization of $C_3$ and $C_4$ olefins or from the polymerization of one or more olefins of from 2 to 6 carbon atoms per molecule, is selected as the feed for the pretreatment step. This is particularly true if such olefin feed stock has been stored for a period of time whereby oxygen-containing compounds may have been formed therein. The crude olefin feed stock is charged to the pretreatment step at a pressure of about atmospheric, though in some cases a higher pressure may be desired, and at a flow rate of about 0.1 to about 5 and preferably of from 1 to 2 liquid volumes per volume of adsorbent per hour. Temperatures within the pretreatment zone are dependent upon the type and activity of the catalyst and the like, and may range from about 0 to 150° F. and preferably from 60 to 100° F. The effluent olefinic material from the pretreating step, after suitable stabilization and/or fractionation, if desired, is charged to the mercaptan synthesis reactor in admixture with hydrogen sulfide. The catalyst for the mercaptan synthesis may comprise a silica-metal oxide gel, such as synthetic silica-alumina. The mercaptan synthesis reaction temperature is maintained between 100 and 300° F. or higher, at flow rates between about 1 and 10 liquid volumes per volume of catalyst per hour. Under the conditions of this invention, where especially treated high boiling olefins are employed, the principal reaction occurring is the addition of hydrogen sulfide to the olefinic linkages so that the combined sulfur appears as mercaptans substantially corresponding in carbon content to that of the olefins in the feed. The final effluent is treated by conventional means for recovery of hydrogen sulfide and the unreacted hydrocarbon is distilled from the product under diminished pressure. Other suitable treatment, such as solvent extraction, chemical adsorption, etc., may be applied to the effluent to recover the mercaptans or to separate hydrogen sulfide from unreacted olefins. The hydrogen sulfide and the unconverted olefins are ordinarily recycled to the mercaptan synthesis reactor.

Solid surface active materials are preferred for each of the two steps of the process of the present invention and are selected in accordance with their activity toward the removal of the deleterious compounds and mercaptan-forming reactions, respectively. In the first or pretreating step, silica gel is ordinarily the preferred surface active material although activated charcoal or activated clays may be employed. The hydrogen sulfide-olefin reaction is adequately catalyzed by solid catalysts comprising metal oxides of which certain activated gel-type silica-alumina compositions are preferred. Temperatures applicable in the mercaptan synthesis where silica-alumina-type gel catalysts are employed include the range of 100 to 400° F. with a somewhat narrower range of 200 to 300° F. being preferred. Since the condensation reaction is usually promoted by super-atmospheric pressures, operating pressures may be in the range of about 500 to 1500 pounds per square inch. The following examples further exemplify the process and the advantages of the present invention.

*Example I*

A 320–390° F. cut of heavy polymer from a catalytic polymerization plant charging propylene and butylenes derived from a non-catalytic isobutane dehydrogenation plant is admixed with hydrogen sulfide to give an olefin-hydrogen sulfide mol ratio of approximately 1:1.5. The feed is charged under a pressure of 800 pounds gauge to a catalyst case containing 20–30 mesh super filtrol catalyst, an activated clay, at a flow rate of 1.5 liquid volumes per volume of catalyst per hour. The temperature in the catalyst case is maintained at 215-225° F. The product stream is passed through a pressure release valve and the hydrogen sulfide is largely removed in a flash drum. The last traces of hydrogen sulfide and the low-boiling mercaptans are removed by a distillation over a partial vacuum. The unreacted heavy olefin is separated from the product mercaptan at a high vacuum stripping operation. The weight per cent of olefin converted per pass under these conditions is 18.6.

*Example II*

When the 320-390° F. cut of heavy polymer used in Example I is pretreated by passing it over silica gel at a temperature in the range of 70 to 90° F. and at atmospheric pressure and then passed to the hydrogen sulfide-olefin reaction zone under the same conditions as given in Example I the weight per cent conversion of olefin to mercaptan per pass is increased from 18.6 to 33.9.

*Example III*

When the 320-390° F. heavy polymer fraction of Example I is pretreated by passing it over activated charcoal at a temperature in the range of 70 to 90° F. and at atmospheric pressure and then passed to the hydrogen sulfide-olefin reaction zone under the same conditions as given in Example I the weight per cent conversion of olefin to mercaptan per pass is increased from 18.6 to 31.6.

It is to be understood that the invention should not be unduly limited by the above examples, inasmuch as other feed stocks and reaction conditions may be utilized as disclosed herein. While it is preferred to use olefinic polymers, olefins from any other suitable source may advantageously be subjected to pretreatment by the process of this invention prior to their conversion to mercaptans. As will be appreciated by one skilled in the art, various modifications of this invention may be practiced in the light of the present disclosure and teaching without departing from the invention and the scope of the claims.

I claim:

1. An improved process for the production of stable aliphatic mercaptans of high molecular weight which comprises subjecting an olefinic hydrocarbon material boiling in the range of 320° F. to 400° F. and comprising a plurality of isomeric olefins and oxygen-containing compounds to the action of a solid adsorbent material selected from the group consisting of silica gel, activated charcoal and activated clay at a temperature of from zero to 150° F. whereby said oxygen-containing compounds are removed from said olefinic hydrocarbon material, reacting a resulting treated olefinic hydrocarbon material, directly and before any further substantial amount of oxygen-containing compounds can form in said hydrocarbon material, with hydrogen sulfide in the presence of a mercaptan-synthesis catalyst and in amounts to give a mol ratio of hydrogen sulfide to olefin between about 1.5:1 to 2:1 at a pressure of about 500 to 1500 pounds per square inch, a temperature of about 100 to 400° F. and a flow rate such as to effect a high per pass conversion of said isomeric olefins contained in said olefinic hydrocarbon material to stable aliphatic mercaptans having the same number of carbon atoms per molecule as said isomeric olefins, and recovering said mercaptans as a product of the process.

2. An improved process for the production of stable aliphatic mercaptans of high molecular weight which comprises subjecting a mixed propylene-butylene polymer fraction boiling not lower than 320° F. and not higher than about 400° F. and comprising a plurality of isomeric olefins and oxygen-containing compounds to the action of silica gel at a temperature of from zero to 150° F. and a flow rate such as to effect removal of said oxygen-containing compounds, reacting a resulting pretreated propylene-butylene polymer fraction, directly and before any further substantial amount of oxygen-containing compounds can form in said fraction, with hydrogen sulfide in the presence of a mercaptan-synthesis catalyst and in amounts to give a mol ratio of hydrogen sulfide to olefin between about 1.5:1 to 2:1 at a pressure of about 500 to 1500 pounds per square inch, a temperature of about 100 to 400° F. and a flow rate such as to effect a high per pass conversion of said propylene-butylene polymers to aliphatic mercaptans having the same number of carbon atoms per molecule as said olefins contained in said polymer fraction, and recovering said mercaptans as a product of the process.

3. An improved process for the production of stable aliphatic mercaptans of high molecular weight which comprises subjecting a mixed propylene-butylene polymer fraction boiling not lower than 320° F. and not higher than about 400° F. and comprising a plurality of isomeric olefins and oxygenated compounds to the action of activated charcoal at a temperature of from zero to 150° F. and a flow rate such as to effect removal of said oxygenated compounds, reacting a resulting pretreated propylene-butylene polymer fraction, directly and before any further substantial amount of oxygen-containing compounds can form in said fraction, with hydrogen sulfide in the presence of a mercaptan-synthesis catalyst and in amounts to give a mol ratio of hydrogen sulfide to olefin between about 1.5:1 to 2:1 at a pressure of about 500 to 1500 pounds per square inch, a temperature of about 100 to 400° F. and a flow rate such as to effect a high per pass conversion of said propylene-butylene polymers to mercaptans having the same number of carbon atoms per molecule as said olefins contained in said polymer fraction, and recovering said mercaptans as a product of the process.

4. An improved process for the production of stable mercaptans of high molecular weight which comprises subjecting a mixed propylene-butylene polymer fraction boiling not lower than 320° F. and not higher than about 400° F. and comprising a plurality of isomeric olefins and oxygen-containing compounds to the action of activated clay at a temperature of from zero to 150° F. and a flow rate such as to effect removal of said oxygen-containing compounds, reacting a resulting pretreated propylene-butylene polymer fraction, directly and before any further substantial amount of oxygen-containing compounds can form in said fraction, with hydrogen sulfide in the presence of a mercaptan-synthesis catalyst and in amounts to give a mol ratio of hydrogen sulfide to olefin between about 1.5:1 to 2:1 at a pressure of about 500 to 1500 pounds per square inch, a temperature of about 100 to 400° F. and a flow rate such as to effect a high per pass conversion of said propylene-butylene polymers to mercaptans having the same number of carbon atoms per molecule as said olefins contained in said polymer fraction, and recovering said mercaptans as a product of the process.

5. An improved process for the production of stable aliphatic mercaptans of high molecular weight which comprises subjecting a propylene-butylene polymer having a boiling range of 320–390° F. and comprising a plurality of isomeric olefins and oxygenated compounds to the action of silica gel at a temperature of from 70–90° F. whereby said oxygenated compounds contained in said polymer fraction are removed, reacting a resulting treated polymer fraction, directly and before any further substantial amount of oxygen-containing compounds can form in said fraction, with hydrogen sulfide in the presence of activated clay as a catalyst and in the amounts to give a mol ratio of hydrogen sulfide to olefin between 1.5:1 to 2:1 at a pressure of about 800 pounds per square inch gauge, a temperature of 215–225° F. and a flow rate such as to effect a high per pass conversion of said polymer fraction to mercaptans having the same number of carbon atoms per molecule as said olefins contained in said polymer fraction and recovering said mercaptans so produced as a product of the process.

6. An improved process for the production of stable aliphatic mercaptans of high molecular weight which comprises subjecting a propylene-butylene polymer having a boiling range of 320–390° F. and comprising a plurality of isomeric olefins and oxygenated compounds to the action of activated charcoal at a temperature of from 70–90° F. whereby said oxygenated compounds contained in said polymer fraction are removed, reacting a resulting treated polymer fraction, directly and before any further substantial amount of oxygen-containing compounds can form in said fraction, with hydrogen sulfide in the presence of activated clay as a catalyst and in the amounts to give a mol ratio of hydrogen sulfide to olefin between 1.5:1 to 2:1 at a pressure of about 800 pounds per square inch gauge, a temperature of 215–225° F. and a flow rate such as to effect a high per pass conversion of said propylene-butylene polymer fraction to mercaptans having the same number of carbon atoms per molecule as said olefins contained in said polymers and recovering said mercaptans so produced as a product of the process.

7. An improved process for the production of stable aliphatic mercaptans of high molecular weight which comprises subjecting an olefinic hydrocarbon material boiling in the range of 320° F. to 400° F. and comprising a plurality of isomeric olefins to the action of a solid adsorbent material selected from the group consisting of silica gel, activated charcoal and activated clay at a temperature of from zero to 150° F. reacting a resulting treated olefinic hydrocarbon material, directly and before any further substantial amount of oxygen-containing compounds can form in said hydrocarbon material, with hydrogen sulfide in the presence of a mercaptan-synthesis catalyst and in amounts to give a mol ratio of hydrogen sulfide to olefin between about 1.5:1 to 2:1 at a pressure of about 500 to 1500 pounds per square inch, a temperature of about 100 to 400° F. and a flow rate such as to effect a high per pass conversion of said isomeric olefins contained in said olefinic hydrocarbon material to stable aliphatic mercaptans having the same number of carbon atoms per molecule as said isomeric olefins, and recovering said mercaptans as a product of the process.

8. An improved process for the production of stable aliphatic mercaptans of high molecular weight which comprises subjecting an olefinic hydrocarbon material boiling in the range of 320° F. to 400° F. and comprising a plurality of isomeric olefins to the action of silica gel at a temperature of from zero to 150° F. reacting a resulting treated olefinic hydrocarbon material, directly and before any further substantial amount of oxygen-containing compounds can form in said hydrocarbon material, with hydrogen sulfide in the presence of a mercaptan-synthesis catalyst and in amounts to give a mol ratio of hydrogen sulfide to olefin between about 1.5:1 to 2:1 at a pressure of about 500 to 1500 pounds per square inch, a temperature of about 100 to 400° F. and a flow rate such as to effect a high per pass conversion of said isomeric olefins contained in said olefinic hydrocarbon material to stable aliphatic mercaptans having the same number of carbon atoms per molecule as said isomeric olefins, and recovering said mercaptans as a product of the process.

9. In a process wherein a liquid olefin feed stream consisting essentially of $C_{12}$ to $C_{16}$ olefin hydrocarbons derived from catalytically copolymerizing $C_3$ and $C_4$ and olefins and containing oxygen-containing compounds is reacted with hydrogen sulfide to produce stable aliphatic mercaptans, that improvement which comprises, contacting said liquid olefin feed stream with a solid adsorbent material selected from the group consisting of silica gel, activated charcoal and activated clay at a temperature of from 60° F. to 100° F. and at a flow rate of from 1 to 2 liquid volumes per volume of adsorbent per hour, thereby removing said oxygen-containing compounds from said liquid olefin feed, and subsequently reacting a resulting liquid olefin feed with hydrogen sulfide directly and before any further substantial amount of oxygen-containing compounds can form in said feed.

PAUL F. WARNER.

REFERENCES CITED

The following references are of record in the file of this patent:

UNITED STATES PATENTS

| Number | Name | Date |
|---|---|---|
| 2,165,373 | Hofmann et al. | July 11, 1939 |
| 2,351,167 | Ware | June 13, 1944 |
| 2,392,555 | Schulze | Jan. 8, 1946 |
| 2,402,804 | Chechot | June 25, 1946 |
| 2,410,642 | Farkas et al. | Nov. 5, 1946 |
| 2,449,402 | Lipkin et al. | Sept. 14, 1948 |